United States Patent
Prevotat et al.

(10) Patent No.: US 6,358,463 B1
(45) Date of Patent: Mar. 19, 2002

(54) METHOD AND INSTALLATION FOR TREATING PLASTIC TUBES WITH BI-AXIAL DRAWING

(75) Inventors: Bernard Prevotat, Le Chesnay; Jean-Jacques Acket, Challuy, both of (FR)

(73) Assignee: Alphacan (FR)

( * ) Notice: Subject to any disclaimer, the term of this patent is extended or adjusted under 35 U.S.C. 154(b) by 0 days.

(21) Appl. No.: 09/147,932
(22) PCT Filed: Sep. 18, 1997
(86) PCT No.: PCT/FR97/01653
  § 371 Date: Mar. 22, 1999
  § 102(e) Date: Mar. 22, 1999
(87) PCT Pub. No.: WO98/13182
  PCT Pub. Date: Apr. 2, 1998

(30) Foreign Application Priority Data

Sep. 26, 1996 (FR) .............................................. 96 11705

(51) Int. Cl.$^7$ .............................................. B29C 49/04
(52) U.S. Cl. ........................ 264/532; 264/573; 264/148; 264/237; 264/348
(58) Field of Search ................................ 264/532, 531, 264/535, 570, 573, 523, 348, 237, 148

(56) References Cited

U.S. PATENT DOCUMENTS

| | | | |
|---|---|---|---|
| 4,340,344 A | 7/1982 | Aston et al. | 425/149 |
| 4,499,045 A | * 2/1985 | Obsomer | 264/532 |
| 5,000,905 A | * 3/1991 | Cox et al. | 264/532 |
| 5,096,654 A | 3/1992 | Tsadares et al. | 264/40.2 |

FOREIGN PATENT DOCUMENTS

| | | | |
|---|---|---|---|
| EP | 0021438 A1 | 1/1981 | B29C/25/00 |
| EP | 0 468 417 A2 | 1/1992 | C08G/75/02 |
| FR | 2 462 254 | 2/1981 | B29C/17/07 |
| JP | 05329926 | 12/1993 | B29C/55/26 |

\* cited by examiner

*Primary Examiner*—Suzanne E McDowell
(74) *Attorney, Agent, or Firm*—Pennie & Edmonds LLP

(57) ABSTRACT

The invention concerns a method for treating plastic tubes, in particular PCV tubes, obtained by extrusion, whereby a tube is brought to a molecular orientation temperature, higher than room temperature, and is subjected to bi-axial drawing by radial expansion and axial elongation, to obtain a bi-oriented tube whose mechanical properties are improved. The tube (T) is cut into elements (4) of predetermined length immediately after being extruded and its temperature is higher than the molecular orientation temperature, each element constituting a blank (5); each blank (5) is placed in a chamber (E) to be cooled therein by a fluid (F) to a temperature close to the molecular orientation temperature, the dwell time of the blank in the chamber being greater than the time of its production by extrusion; and the blank (5) is then extracted from the chamber (E) to be subjected to a treatment enabling its bi-orientation.

9 Claims, 3 Drawing Sheets

METHOD AND INSTALLATION FOR TREATING PLASTIC TUBES WITH BI-AXIAL DRAWING

The invention relates to a method for the processing of plastic tubes obtained by extrusion, the said method being of the type according to which a plastic tube is brought to a molecular orientation temperature higher than the ambient temperature and is subjected to biaxial stretching by radial expansion and by axial elongation, in order to obtain a bi-orientation tube which has improved mechanical properties.

Such a method is known, particularly from the documents GB-A-1,432,539 or U.S. Pat. No. 4,340,344. The additional processing of the plastic tubes which this method necessitates entails an appreciable increase in the prices of the finished products. However, the great improvement in the mechanical characteristics of the products, in particular increase in mechanical resistance to internal pressure, is conducive to employing this method for products, in particular tubes intended for conveying fluids under pressure, which must have good mechanical resistance.

According to the known method, the tubes manufactured by extrusion are stored at ambient temperature, are subsequently taken from stock and are brought by heating from the ambient temperature to the molecular orientation temperature in order to undergo the processing. The heating of a tube to be processed is relatively lengthy and involves a high energy consumption, since it is necessary to cause the tube to change from the ambient temperature to the molecular orientation temperature. The result of this is that the efficiency of the processing method is not very high and needs to be improved.

The object of the invention is, above all, to provide a method for the processing of tubes made of plastic, especially PVC (polyvinyl chloride), as defined above, which allows higher efficiency, in particular by a reduction in the processing time and by a decrease in the energy consumption necessary for processing.

It is desirable that the method should make it possible to improve the temperature profile in the wall of the tube for the purpose of the biaxial stretching of the latter.

It is desirable, furthermore, that the processing method should remain relatively simple and not require too great an amount of floor space, so that the cost of investments for carrying out the method remains acceptable.

According to the invention, a method for the processing of tubes made of plastic, especially PVC, obtained by extrusion, according to which a plastic tube is brought to a molecular orientation temperature higher than the ambient temperature and is subjected to biaxial stretching by radial expansion and by axial elongation, in order to obtain a bi-orientation tube having improved mechanical properties, is characterized in that:

the tube is cut into elements of specific length when it has just been extruded and when its temperature is higher than the molecular orientation temperature, each element constituting a blank;

each blank is placed in an enclosure in order to be cooled there by a fluid at a temperature near the molecular orientation temperature, the dwell time of the blank in the enclosure being longer than the time for producing the blank by extrusion, in order to allow a correct temperature setting.

Should this dwell time be considered too long, it is possible for the blank to be cooled sharply, but briefly, before it is introduced into the enclosure, by spraying or by means of a bath of cold water. A thin layer of material could then be temporarily at a temperature below the temperature desired for the bi-orientation operation.

The blank is subsequently extracted from the enclosure in order to undergo the processing which ensures bi-orientation.

Preferably, just after being extruded and before being cut, the tube is cooled superficially by passing through a cooling fixture, in order to ensure a clean cut of the still hot tube.

The tube is advantageously cut by means of a shearing operation with a blade device of the guillotine type.

The fluid enclosure is advantageously formed by a tank of hot water which, in the case of PVC processing, is at a temperature near or equal to its boiling temperature at atmospheric pressure.

It is desirable to ensure the best (and uniform) transfer of heat between the fluid and an article of complex shape (the exterior and interior of a tube of great length). For this purpose, preferably, the blanks are agitated in the enclosure. Advantageously, the fluid is circulated in the enclosure, in particular in a direction parallel to the axis of the tube.

The invention also relates to an installation for carrying out the method for the processing of plastic tubes, as defined above.

An installation for the processing of tubes made of plastic, especially PVC, according to the invention comprises an extruder for producing a tube and means for subjecting the tube to biaxial stretching by radial expansion and by axial elongation, in order to obtain a bi-orientation tube having improved mechanical properties, and is characterized in that it comprises:

cutting means at the exit of the extruder, for delivering the tube in elements of specific length when it has just been extruded and when its temperature is higher than the molecular orientation temperature, each cut element constituting a blank;

an enclosure for receiving the blanks and cooling them by means of a fluid at a temperature near the molecular orientation temperature, the enclosure being provided for ensuring a dwell time of the blank longer than the time for producing the blank by extrusion, in order to allow the correct temperature setting, and means for extracting the blank from the enclosure in order to cause it to pass to the means for carrying out biaxial stretching.

A cooling fixture may be provided at the exit of the extruder, in order to cool the tube superficially and allow a clean cut of the still hot tube.

The cutting means advantageously consist of a cutting-blade device of the guillotine type, in particular fastened to the cooling fixture.

The fluid enclosure may be formed by a tank of hot water which, in the case of PVC processing, is at a temperature near or equal to its boiling temperature at atmospheric pressure.

Means for circulating the fluid in the tank, in particular in the axial direction of the blanks, are provided.

Preferably, the blanks are agitated in the enclosure.

Means for setting in rotation the blank which will be extracted next from the tank may be provided.

Advantageously, a roller conveyor or a belt device is arranged at the exit of the extruder, in alignment with the latter, in order to receive the tube. The speed of the conveyor is substantially equal to the exit speed of the tube from the extruder, in order to reduce the stresses on the emerging tube to a minimum. The speed of the conveyor may be variable around this condition for the purpose of overthickening (or under-thickening) the tube blank locally.

The fluid enclosure for setting the temperature of the blank is preferably placed on one side of the conveyor at a lower level. Pushing means are provided for displacing the blank transversely and causing it to enter the fluid enclosure.

Apart from the arrangements described above, the invention consists of some other arrangements which will be discussed more explicitly below with regard to an exemplary embodiment which is described with reference to the accompanying drawings, but which is in no way limiting.

FIG. 1 of these drawings is a simplified diagrammatic top view of an installation for the manufacture of plastic tubes which carries out the processing method of the invention.

Figure 4:
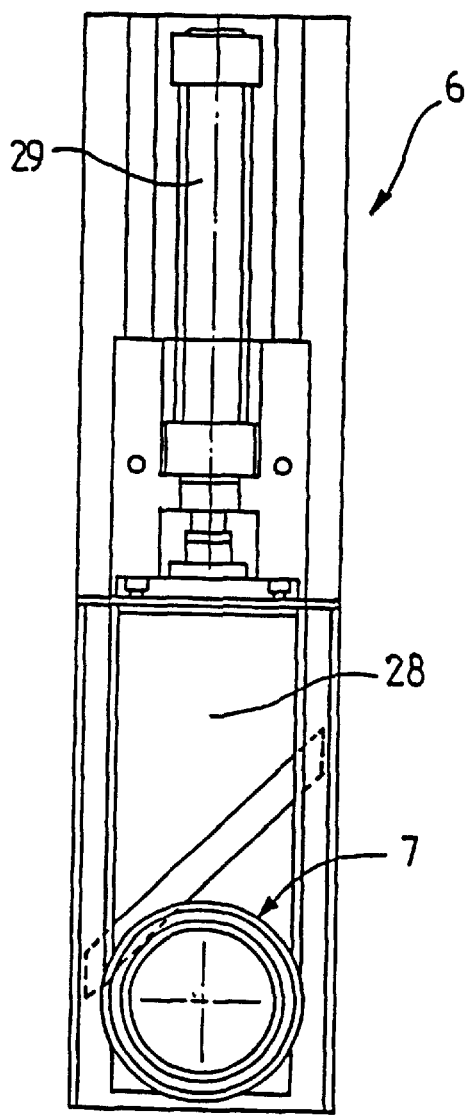
FIG. 4 is an elevation view of the device for cutting the tubes after extrusion.
Figure 5:
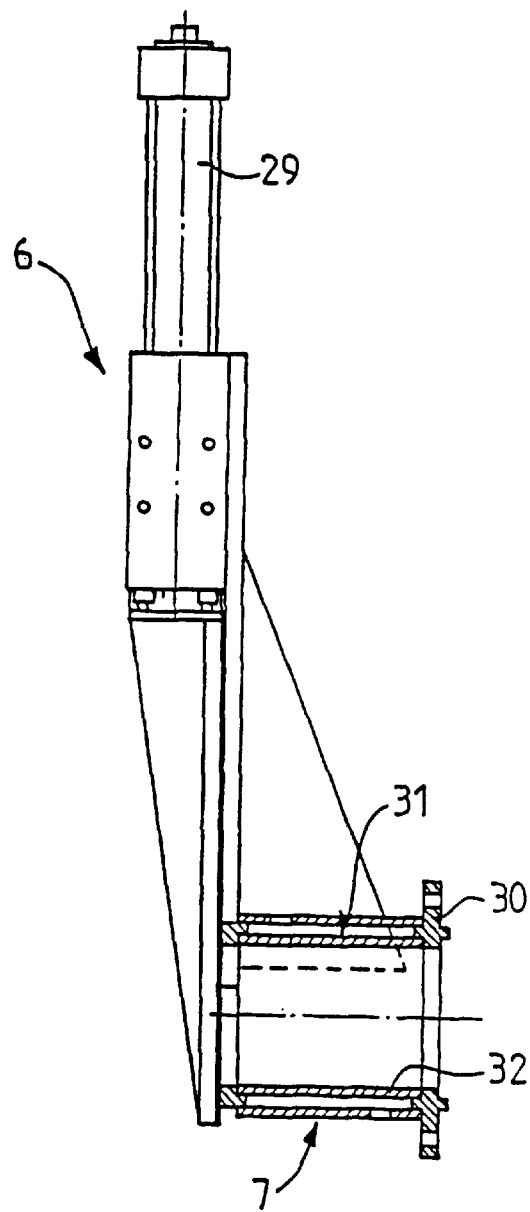

Finally, FIG. 5 is a view from the left in relation to FIG. 4.

Figure 1:
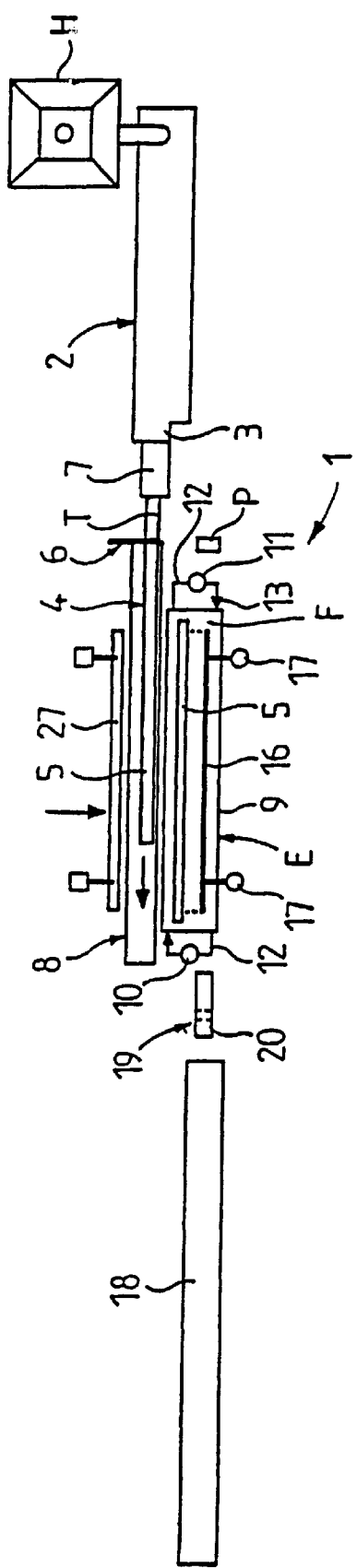
Figure 2:
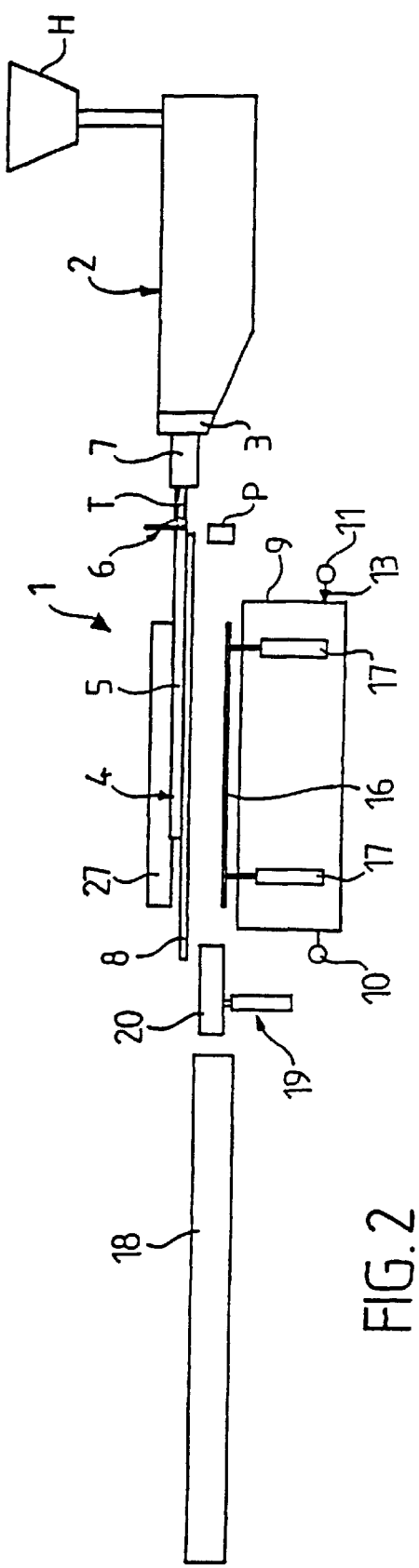
FIG. 2 is a simplified diagrammatic elevation view of the installation of FIG. 1.

Referring to the drawings, in particular to FIGS. 1 and 2, an installation 1 carrying out the method of the invention may be seen.

The installation comprises an extruder 2, shown diagrammatically, which is supplied with thermoplastic granules, especially with PVC granules, from a hopper H shown diagrammatically. As is well known, the twin effects of heat and pressure within the extruder make it possible to agglomerate the plastic granules and obtain, at the exit of the land 3 of the extruder, a tube blank or tube T, the wall of which is relatively soft and at a relatively high temperature. With regard to PVC, the temperature of the wall of the tube at the exit of the extruder is of the order of 180° C. to 200° C.

In a conventional installation (not shown), the extruder is followed by a unit (not shown) ensuring progressive cooling of the tube T which becomes rigid in proportion to this cooling. At the exit of such a cooling unit, the tube, which has not undergone the processing ensuring that it has bi-orientation, is delivered in portions of specific length and stored at ambient temperature. The portions thus prepared are subsequently picked up again in order to undergo the bi-orientation processing after prior heating to the molecular orientation temperature. The cutting of the tube at the exit of the cooling unit takes place relatively easily because the tube is rigid.

The length of the cooling unit depends on a plurality of parameters, in particular on the thickness of the tube emerging from the extruder. As a non-limiting indication, the thickness range of tube blanks T may be from a few millimetres up to 40 or 50 mm. In the case of tubes having a thick wall, for example of the order of 20 mm, at the exit of the extruder 2, the length of the cooling unit would become very great and would entail high expenditure.

According to the invention, to overcome these disadvantages, the tube T is cut into elements 4 of specific length when it has just been extruded and when its temperature is higher than the molecular orientation temperature, each element thus cut constituting a blank 5.

Experience has shown that such a cut can be made correctly, in particular, by means of shears 6 of the guillotine type which will be described in more detail with reference to FIGS. 4 and 5.

Moreover, a cooling fixture 7 of small length, in particular less than 0.50 m, is advantageously provided at the exit of the extruder and ensures superficial cooling of the tube so as to set the outer layer of the tube and ensure a clean guillotine cut.

The tube emerging from the extruder 2 and from the cooling fixture 7 is received on a roller conveyor 8 arranged in the axial extension of the extruder 2. The speed of the conveyor 8 is substantially equal to the exit speed of the tube T from the extruder, in order to reduce to a minimum the tensile or compressive stresses on the emerging tube. It should be noted that it is possible to overthicken the tube blank T locally by slowing the conveyor 8 at the moment when the material constituting the desired zone passes into the cooling fixture 7. Conversely, the tube blank may be under-thickened locally by accelerating the conveyor 8 at the appropriate moment.

The superficial cooling of the tube, initiated in the cooling fixture 7, may continue above the conveyor 8 by means of a sprinkler bank (not shown) which spreads water over the blank 5. Where PVC is concerned, the surface temperature may then be in the neighbourhood of 70° C.

Each blank 5 is subsequently placed in an enclosure E arranged on one side of the conveyor 8, in order to be cooled there by a fluid F which is substantially at the molecular orientation temperature of the plastic of the blank. In the case of tubes made of PVC, the molecular orientation temperature of which is within a range of approximately 90° C. to 110° C., an advantageous solution involves using the hot water as a cooling fluid at a temperature near its boiling temperature at atmospheric pressure, namely 100° C. In an exemplary embodiment, the water of the tank was at a temperature of between 95° C. and 98° C.

The water from the tank, although being near its boiling temperature, acts as a cooling fluid, since the blank emerging from the extruder is at a temperature of approximately 180° C., in the case of PVC, and since only the superficial zone has been cooled. Thermal self-regulation occurs in the tank 9 by evaporation of the water.

The dwell time of the blank 5 in the tank 9 is sufficient to allow correct temperature setting, that is to say homogenization of the temperature of the blank, essentially in the longitudinal direction and the peripheral direction. The temperature in the thickness of the tube, or radial direction, will be referred to later. The dwell time is longer than the time necessary for producing the blank by extrusion; the dwell time may be of the order of 20 to 30 minutes for PVC tubes, of which the thickness at the exit of the extruder is of the order of 20 mm. The time for producing a blank by means of the extruder is of the order of a few minutes, for example 3 to 5 minutes. Consequently, the tank 9 is designed for storing a sufficient number of blanks and is adapted to the extrusion processing time and to the time for subsequent bi-orientation processing.

Temperature setting thus takes place with a tank 9 of reduced length.

Advantageously, the hot water is circulated within the tank by means of pumps 10, 11 and pipelines 12 connecting longitudinal end zones of the tank to the intake and to the delivery of each pump. The assembly as a whole is arranged so that the circulation of water in the tank 9 takes place in a general direction parallel to the length of the tank and to the axis of the blanks 5 immersed in this tank. The pump 11, located on the right-hand side of the tank 9 according to the drawings, is equipped, at its delivery, with an injector 13 positioned so as to send the water jet into the blank 5a which is the oldest in the tank 9 and which will be the next to be extracted from the tank. According to FIG. 3, this blank 5a is located at the left-hand end of the juxta-position of blanks 5. Moreover, in order to improve further the homogenization of the temperature of the blank 5a, means 14 for driving this blank 5a in rotation are provided. These means 14 may consist of two rollers which are parallel to the axis of the blank and one of which is a driving roller.

The means for driving in rotation 14 are supported by arms 15 in the form of an upturned swan neck. Such arms 15 are distributed in sufficient number in the longitudinal direction of the blank 5a and are fastened to a support 16 which can be raised relative to the frame of the tank 9 by means of one or more jacks 17, in such a way as to extract the blank 5a from the tank 9.

It should be noted that the temperature of the blank 5a is homogenized essentially in the longitudinal direction and the peripheral direction. In the radial direction (thickness) of the blank, it is not necessary for the temperature to be homogeneous. Since the immersion time is relatively short (20 to 30 minutes), the temperature of the PVC at the centre (mid-way in the thickness of the blank) is at an intermediate value between the extrusion temperature (approximately 200° C.) and the temperature of the water (approximately 100° C.). This contributes to improving the subsequent biaxial stretching processing.

Furthermore, means P, merely indicated in FIGS. 1 and 2, are provided for displacing the blank 5a, raised from the tank, in the longitudinal direction and for introducing it into a unit 18, where it will undergo radial expansion and axial elongation leading to bi-orientation and to an improvement in the mechanical properties of the material. A hoist 19 is provided between the hot-water tank 9 and the unit 18. The hoist 19 is equipped with a guide 20 which, in the high position, supports the blank during its transfer from the arms 15 to the unit 18.

Preferably, the blanks 5 stored in the tank 9, with the exception of the blank 5a next to be extracted, are supported by transverse arms 21 mounted pivotably about an axis 22 parallel to the longitudinal direction of the blanks. The arms 21 are actuated in an alternating oscillating movement about the axis 22 by means of a drive system 23 comprising a motor 24 driving an eccentric 25 which is connected to one end of the arm 21 by means of a connecting rod 26.

Figure 3:
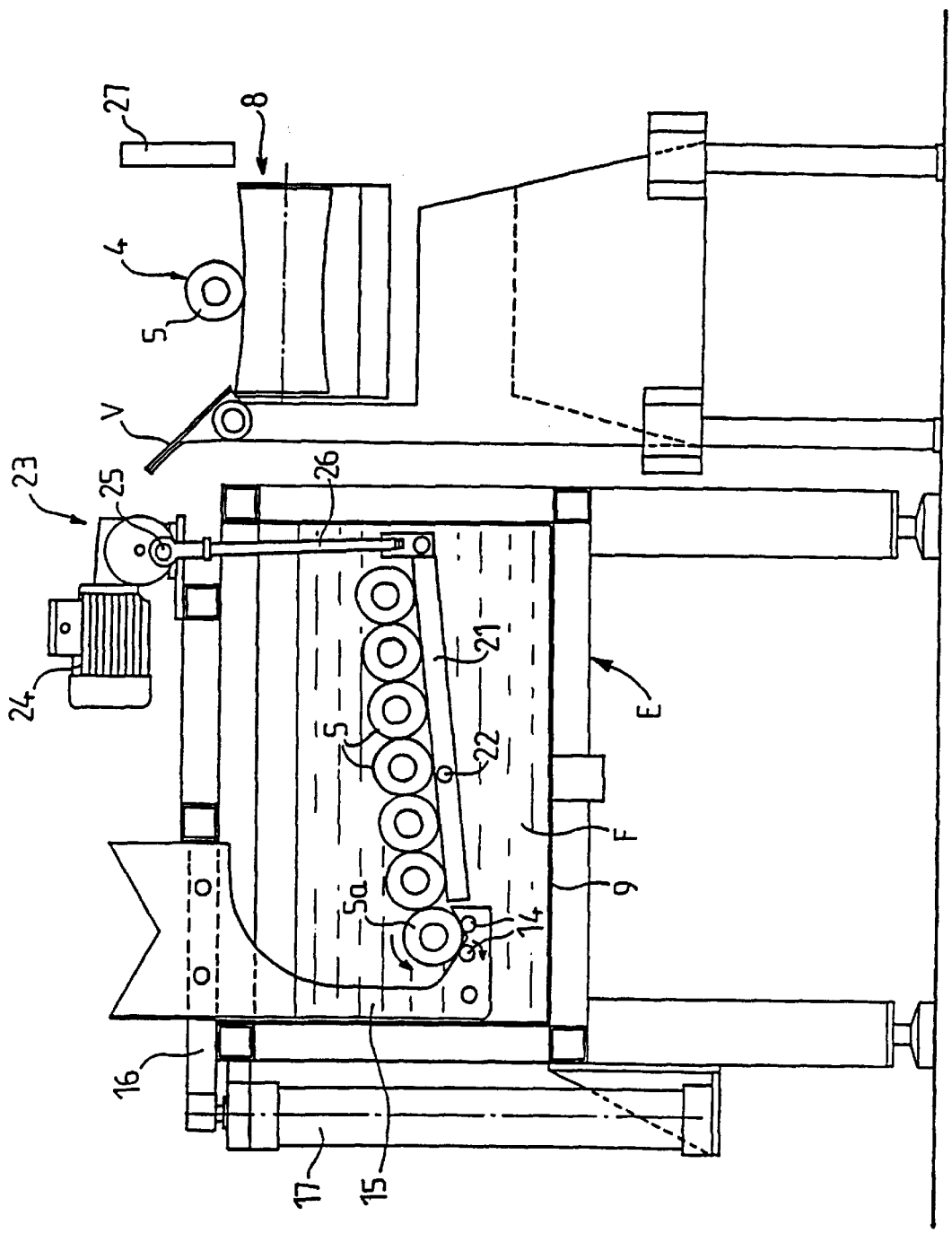
FIG. 3 is a cross-section through an enclosure for the correct temperature setting of the blanks, this enclosure being located next to a conveyor.

As may be seen in FIG. 3, the conveyor 8, which receives the tube at the exit of the extruder 2, is placed parallel to a large side of the tank 9 in the upper region of this tank. A transverse pushing device 27 is provided for transferring the blank 5 into the tank 9 where it falls as a result of gravity.

A tilting flap V (FIG. 3) is provided for allowing the blank 5 to pass, whilst preventing it from falling into the space between the tank 9 and conveyor 8.

The guillotine shears 6 are illustrated in more detail in FIGS. 4 and 5. These shears comprise a blade 28, the cutting edge of which is oblique and which can be displaced vertically by means of a jack 29. In contrast to the diagrammatic illustration in FIGS. 1 and 2, this cutting blade 26 is located at the exit of the cooling fixture 7, of which the end distant from the guillotine 6 is equipped with a flange 30 for fastening to the exit of the extruder. The cooling fixture 7 comprises a cylindrical double casing defining an annular chamber 31, in which the cooling water circulates, the plastic tube passing into the inner cylindrical casing 32 of the cooling fixture 7.

This being so, the installation functions as follows.

The extruder 2, fed with raw material granules or powder by the hopper H, supplies at the exit a soft-walled tube T which, by passing through the cooling fixture 7, is cooled on its surface. The tube T is received on the conveyor 8. When the tube length reaches a predetermined value (for example, 6 meters), the guillotine cutting device 6 cuts off an element 4 which continues its travel on the conveyor 8 until it is in position to be ejected into the tank 9.

The pushing device 27 is then triggered in order to push the element 4/blank 5 towards the tank 9 transversely relative to the conveyor 8.

The last blank 5 which has entered the tank 9 is located on the right according to FIG. 3. This blank will dwell for a time equal to a multiple of the time necessary for the extrusion of an element and will be displaced progressively in the transverse direction towards the rollers 14. When the blank arrives at 5a on the rollers 14, it is set in rotation about its axis and a stream of water coming from the injector 13 passes through it along its axis.

The blank 5a is subsequently raised by the arms 15 and is pushed longitudinally by the device P in order to pass onto or into the guide 20 and enter the processing unit 18 which is in alignment with the blank 5a raised by the arms 15.

The method and installation of the invention allow in-line processing of the tubes, that is to say the bi-orientation processing can be carried out consecutively to the extruder. The intermediate tank 9, by storing several blanks, makes it possible to set the temperature correctly, whilst ensuring a reduced overall size.

The energy saving is appreciable, since the blank, which is at a temperature higher than the molecular orientation temperature, is brought to the latter temperature directly, without being cooled to ambient temperature, which would have necessitated subsequent reheating.

The extrusion installation is simplified, since it does not have either a unit for ensuring substantial cooling or a device for drawing the tube.

The invention has been described by reference to the example of PVC, but it is clear that it applies to other plastics capable of undergoing similar processing, for example polyethylene or polypropylene. It is expedient to regulate the temperature of the fluid of the enclosure E according to the plastic.

The fluid used in the enclosure E may, of course, be different from water. It is possible, for example, to complete or replace the action of the water by air or by oil.

What is claimed is:

1. Method for the processing of tubes made of plastic, obtained by extrusion, according to which a tube is brought to a molecular orientation temperature higher than ambient temperature and is subjected to biaxial stretching by radial expansion and by axial elongation, in order to obtain a bi-orientation tube having improved mechanical properties, characterized in that:

the tube (T) is cut into elements (4) of specific length when it has just been extruded and when its temperature is higher than the molecular orientation temperature, each element constituting a blank (5);

each blank (5) is placed in an enclosure (E) in order to be cooled there by a fluid (F) at a temperature near the molecular orientation temperature, the dwell time of the blank in the enclosure being longer than the time for producing the blank by extrusion, in order to allow correct temperature setting, and the blank (5a) is subsequently extracted from the enclosure (E) in order to undergo the processing which ensures bi-orientation.

2. Method according to claim 1, characterized in that the tube (T), just after being extruded and before being cut, is cooled superficially by passing through a cooling fixture (7), the length of which is less than 0.50 m.

3. Method according to claim 1, characterized in that the tube is cut by means of a shearing operation with a guillotine device (6) with a blade (28).

4. Method according to claim 1, characterized in that the fluid enclosure (E) is formed by a hot-water tank (9).

5. Method according to claim 4, characterized in that the temperature of the water is near 100° C.

6. Method according to claim 5, characterized in that the water temperature is within a range of 95° C. to 98° C.

7. Method according to claim 4, characterized in that the blanks (5) are agitated in the enclosure (E).

8. Method according to claim 1, characterized in that the fluid is circulated in the enclosure, in particular in a direction parallel to the axis of the tube.

9. Method according to claim 1, characterized in that the plastic is PVC.

* * * * *